Aug. 26, 1941.   C. J. BURKLEY   2,253,759
METHOD OF MAKING SAFETY TUBES
Filed Jan. 26, 1940   2 Sheets-Sheet 1
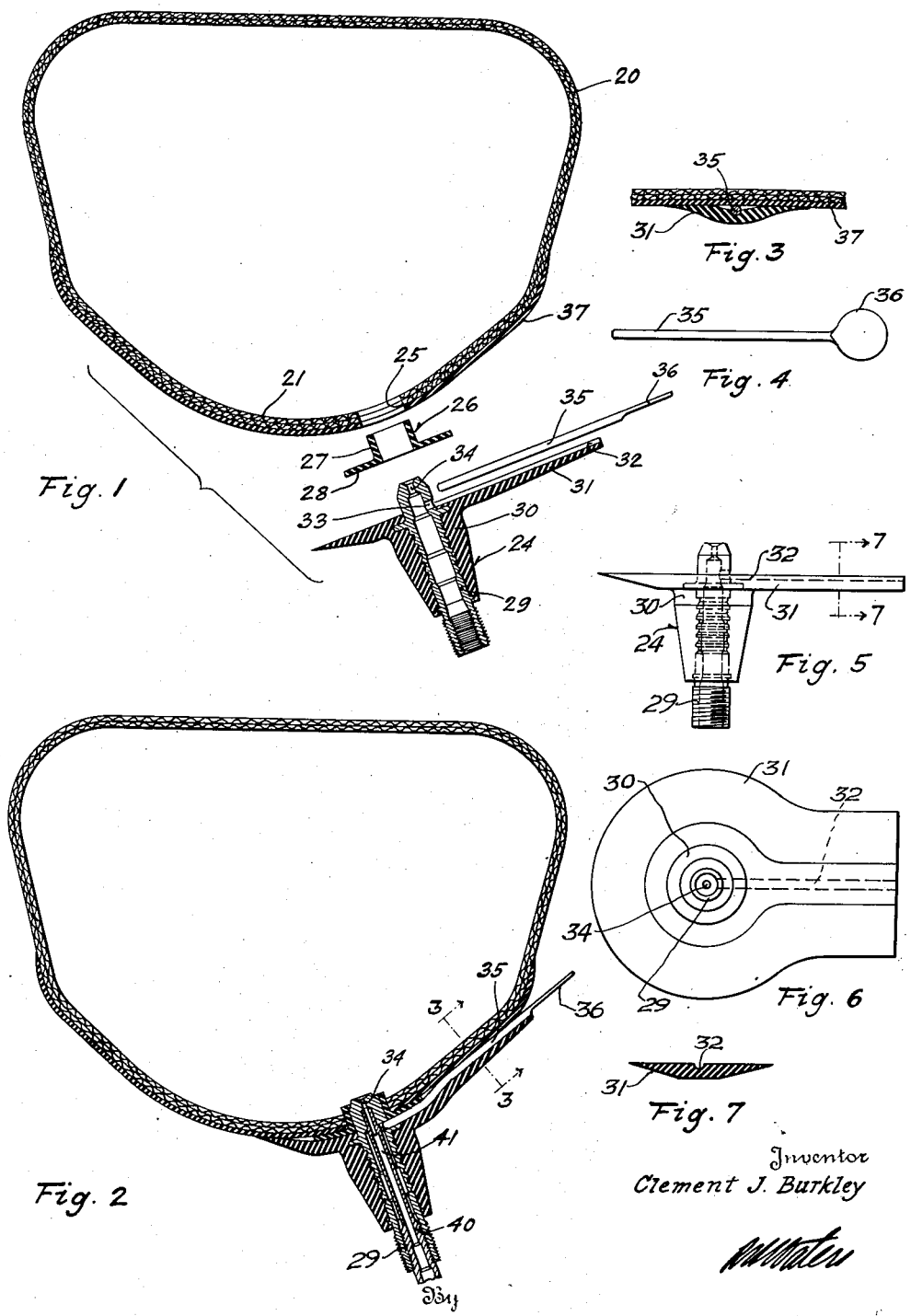
Inventor
Clement J. Burkley
Attorney

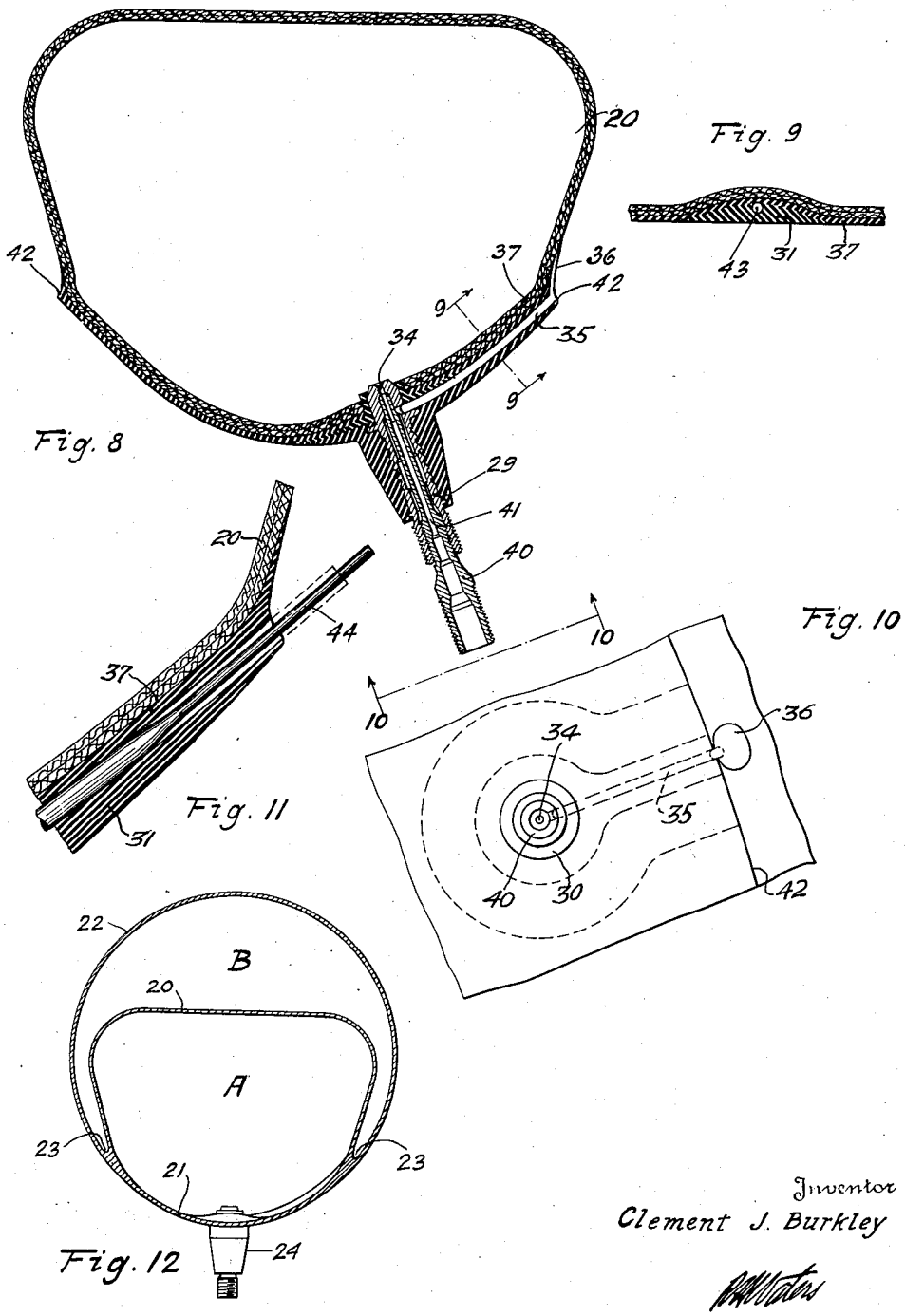

Patented Aug. 26, 1941

2,253,759

UNITED STATES PATENT OFFICE 2,253,759

METHOD OF MAKING SAFETY TUBES

Clement J. Burkley, Akron, Ohio, assignor to Wingfoot Corporation, Wilmington, Del., a corporation of Delaware Application January 26, 1940, Serial No. 315,715

16 Claims. (Cl. 154—14)

The present invention relates to safety tubes of the type employing a plurality of chambers so constructed that in the event of failure of one chamber a reserve chamber or reserve chambers remain intact to sustain the vehicle and thus enable the vehicle to be brought to a safe stop.

In the present case the invention is illustrated as being applied to a safety tube of the type in which one annular tube is arranged within a second larger annular tube and is adjoined to the base of the latter tube much as in the patent to Lee 2,173,065.

One object of this invention is to provide an improved method for constructing a plural chamber tube having a valve structure which will permit quick inflation of both chambers of the tube.

Another object of this invention is to provide a quick and inexpensive method for building into the tube structure a valve mechanism which is to accomplish the aforesaid results.

Another object of this invention is to provide a main valve structure which is of substantially standard size to employ a standard size of valve insert and which may be used with the usual air chuck on air-pressure lines for inflating inner tubes for tires and the like.

Another particular object of this invention is to provide a valve of the character described which permits of inflation of both compartments of the inner tube through a single valve in the customary manner for inflating single tubes, while at the same time maintaining the safety features of a tube such as that described in the aforesaid patent to Lee.

With a device such as shown in the Lee patent, it is necessary to inflate the inner tube slowly so that pressure will not be built up in that tube in excess of the pressure in the outer tube, since the outer tube only receives the air through a small opening or grommet from the air supplied to the inner tube.

Various devices have been evolved for dual inflation of plural-chambered tubes involving complicated mechanisms, special valve inserts, dual valve inserts and special valves between the chambers which permit quick passage of the air between the compartments or chambers, but these lack the very desirable safety feature of having a positive and always definite size for the passage between the air chambers when a blowout occurs, whereby there is positive control of the rate at which either chamber will deflate after the other chamber has failed and regardless of which chamber fails.

Other objects of the invention will appear hereinafter as the description of the invention proceeds, the novel features, arrangements and combinations being clearly set forth in the specification and in the claims thereunto appended.

In the drawings,

Fig. 1 is a cross-section through the inner tube of a safety tube constructed according to my invention with the valve parts illustrated in connection therewith shown near the valve hole in the inner tube ready for application thereto.

Fig. 2 is a similar view with the valve parts in assembled relation but before vulcanization of the inner tube.

Fig. 3 is a cross-section taken along the line 3—3 of Fig. 2.

Fig. 4 is a plan view of a device used only during the molding operation to form the passage through which air is supplied to the outer tube of the safety tube.

Fig. 5 is a side elevation of the valve body and rubber extension thereon as applied to the inner tube.

Fig. 6 is a bottom plan view of the device shown in Fig. 5.

Fig. 7 is a cross-section taken along the line 7—7 of Fig. 5.

Fig. 8 is a cross-section similar to Figs. 1 and 2 showing the parts in the positions which they occupy after the preliminary vulcanization of the inner tube and illustrating further the method employed for inflating only the inner chamber during the molding operation.

Fig. 9 is a cross-section taken along the line 9—9 of Fig. 8 with the core member removed.

Fig. 10 is a view looking in the direction 10—10 of Fig. 8.

Fig. 11 illustrates somewhat schematically another method of forming the passage through which air is supplied from the valve body to the outer tube, and Fig. 12 is a diagrammatic cross-section through the completed tube.

For the sake of illustration there is shown in the accompanying drawings a safety tube having the general contour of the safety tube illustrated in the aforesaid Lee patent. In the various views the outer expansible chamber is omitted except in Fig. 12.

While I have shown this invention as applied to this type of tube, its usefulness is not limited to a tube so designed or shaped and the invention is not intended to be limited by the drawings except insofar as hereinafter pointed out in the claims appended.

In the patent to Lee there is disclosed a structure in which after inflation of the two chambers of that tube equalization of the pressure is maintained by a relatively small port which is always open and which has one function to equalize the pressures in the chambers and another function to permit leakage out of the one chamber upon the failure of the other chamber, as in the case of a blowout. These desirable features are retained in the present type of safety tube but the added advantage is that the user of such a tube can inflate the tube at the normal rate employed for the inflation of ordinary single-chambered inner tubes.

To accomplish this, applicant prefers to inflate the outer chamber of the safety tube and permit the air to slowly filter into the inner tube until a balance of pressure results. The inner tube chamber will first be collapsed by the rush of air into the outer chamber but, under the action of centrifugal force during rotation of the tube when in use on a vehicle, the same will tend to regain its preformed shape and establish the desired quantities of air in both chambers, after which the tube functions practically identically with the safety tube shown in the Lee patent. To accomplish this result I provide the ordinary valve body with a lateral opening which is of a size to permit of a free flow of the air therethrough from the valve body into the outer chamber and also provide another opening in the main valve body, preferably axially thereof, for supplying air to the inner chamber, this latter opening being of relatively small dimensions to act to restrict the flow of air from one chamber to the other while permitting equalization of the pressures in the chambers. This small opening, due to its restricted size, permits only the slow filtration of air therethrough out of one chamber in the event the other chamber fails.

Referring now more particularly to Fig. 12, it will be noted that the completed tube comprises an inner chamber A formed by the annular inner tube 20, formed of a plurality of layers of fabric arranged to prevent longitudinal stretch of the tube 20. If desired the tube can be made with a rubber base portion which permits that portion to stretch and extend down into the wall of a drop-center rim as in the aforesaid Lee patent.

Chamber B is formed by the outer surface of tube 20 and the outer tube 22 made of flexible rubber which is preferably stretchable to fill and conform to the casing used with a tube of this character, all as clearly brought out in the aforesaid Lee patent. This outer tube 22 is joined to the base wall of the inner tube 20, whereby the tubes 20 and 22 may be said to have a common base portion and spaced-apart outer walls from the points 23. These points 23 are preferably located on the tube at points not above the tops of the flanges of a wheel rim to which a tire employing a tube of this character is to be applied.

The present invention has particular reference to the method of building the inner tube 20 and the application of the valve 24 thereto. This inner carcass is shown diagrammatically in a completed state in Fig. 12 with portions of the outer tube 22 illustrated as connected to the inner tube 20 in its base area. The outer tube 22 is preferably of stretchable rubber so that it will expand and fill the casing when inflated.

In the Lee Patent No. 2,090,210, granted August 17, 1937, there is disclosed a method of making a safety tube comprising an inner carcass and an outer carcass, the inner carcass being preferably non-stretchable longitudinally. The tube illustrated in the present case is built in a manner quite similar to the general method employed in building the tube illustrated in that Lee patent. An inner tubular carcass 20 is built up out of fabric with the cords of the fabric laid in such a way as to prevent longitudinal stretch of the tube or, stating it in other words, any appreciable expansion of the tube outwardly under action of centrifugal force, all of which is covered more fully in the aforesaid Lee patents. While I have illustrated the base of tube 20 as being formed of tube fabric in the specific embodiment illustrated, it is to be understood that this base portion may be of rubber, as in the aforesaid Lee patents. My invention particularly contemplates the steps of manufacture of the tube subsequent to the fabrication of the inner tube 20.

After the inner tube 20 has been formed, the base portion 21 thereof is formed with an opening 25, or, if desired, this hole may be formed in the tube during the initial shaping thereof. The cross-section of the tube as illustrated is more or less the shape given to the tube after the step of vulcanization, and in the stage of making shown in Fig. 1 actually the tube would have more of a rounded cross-section.

Into the opening 25 there is placed a rubber cot 26 which has the central tubular sleeve 27 adapted to fit into the hole 25 and a flange 28 adapted to overlie the tube adjacent the opening to seal the base of the valve stem when applied to the tube. The valve 24 is provided with the usual valve body 29 adapted to receive the usual valve insert. The rubber outer body portion 30 of the valve body is provided with a lateral extension 31 grooved as at 32 on the under or tube-adjacent side thereof. This groove is aligned with the lateral port 33 in the valve body and this valve body is also provided with an axial port 34 providing the usual passage for the air into the inner tube 20. This port 34 is relatively small, being approximately about .045 inch in diameter for a purpose which will appear later.

A core member 35 having a round cross-section is provided with a flattened head 36 at one end thereof. This core member is preferably made out of a soft, pliable substance, such as lead or solder, and is first coated with a non-vulcanizing cement and then laid in the groove with the end thereof projecting into the opening 33 as best illustrated in Fig. 2. The inner end of the valve body 29 is next inserted into the rubber cot 26 and the lateral extension 31, as well as the rubber base portion of the valve, is pressed against the wall of the tube 20, which is preferably provided with an outer layer of rubber 37 which covers the base area and extends upwardly along the sides of the tube 20.

Fig. 3 clearly illustrates the position of the core member 35 after the lateral extension 31 is pressed against the tube 20. Since the core member 35 is flexible, it will readily conform to the contour of the mold, when the tube is given its preliminary vulcanization.

In order to give the tube this preliminary vulcanization the air should only pass through the port 34 and not through the lateral port 33. For this purpose I provide a special insert 40 threaded at its outer end and provided with a longitudinal bore 41, which communicates with the port 34 only when the insert 40 is threaded into place as illustrated in Fig. 2.

The tube is next inserted into a mold and inflated through the valve insert 40 and the tube is partially cured while so inflated to give it a shape similar to that illustrated in Fig. 8. Note that the flattened metal head 36 has embedded itself into the rubber layer 37 of the tube and is bent to conform to the shape of the tube. The mold is so shaped as to leave ridges at the points 42, for a purpose which will appear later. The core member 35 may now be removed, and this is done by lifting the head 36 thereof out of the recess which it has formed in the side of the tube and pulling on the head 36 to withdraw the core member, thus leaving a passage for the air from the valve body 29 to the space outside the tube 20 above the shoulders 42.

Fig. 9, which is a cross-section along the line 9—9 of Fig. 8, illustrates clearly how the material of the tube is pressed inwardly, leaving the outer surface smooth and forming the passage 43 which is to supply air to the outer chamber of the safety tube. The inner tube is now ready for the application of the outer tube thereto. This is done by using a band of rubber, the edges of which are stitched to the base of tube 20 as described in the patent to Lee 2,090,210, thus forming a tube such as that illustrated in Fig. 12. The special valve insert 40 is removed and the tube is then inserted in a mold and inflated to give the outer rubber portion thereof its shape and final cure. At the same time the inner tube 20 receives its final cure and the tube is ready for use, except for the insertion of the usual valve insert in the valve body 29.

Upon inflation, the air passes freely through the passage 43 into the outer chamber B, while at the same time flowing slowly into the inner chamber A through the port 34. Due to the difference in the rate of flow of the air to the two chambers the inner chamber A is partially collapsed, but the proper total amount of air for both chambers may be supplied rapidly to the complete tube, although an equalization of the air in the two chambers is necessary after the desired inflation has been accomplished. In short, this tube can be inflated to the proper pressure quickly, although most of the air is distributed to the chamber B. It therefore has the advantage over the tube shown in the Lee patents in that it is not necessary to wait for equalization of the air in the two chambers to inflate the tube to the correct pressure, as the pressure is independent of the distribution of the air. Thus, if a pressure gauge indicates that the tube has 30 pounds of air therein, it will still have 30 pounds of air pressure, even after the air has equalized itself in the chambers A and B and the inner tube is distended as shown in Fig. 12. The equalization of the air occurs during the rotation of the tube in use, due to the fact that centrifugal force tends to throw the outer wall of the inner tube outwardly, thus drawing air through the passage 43 into the valve body and through port 34 to the inner tube. Also the inherent tendency of the tube to regain its normal vulcanized shape will cause this equalization, so that when a blowout occurs there will be sufficient air in the inner tube to bring the car to a safe stop without throwing the car to one side or the other in a dangerous manner.

When there is a failure of either tube, as when a blowout occurs, the air filters out of the good chamber into the atmosphere through the opening 34, which meters the rate of flow of the air the same as the relatively small opening called for in the aforesaid Lee patents.

In Fig. 11 I have shown a modified method of forming the opening 43. In place of using a piece of material, such as solder, lead or the like, as illustrated at 34, I employ a piece of soft, vulcanized rubber, such as 44 which, like the part 35, is held in place in the groove 32 by means of a non-vulcanizable cement. After the inner tube is semi-vulcanized the rubber core member 44 is withdrawn by pulling on the end thereof. The pull causes a reduction of the cross-section of the core member, thus permitting its easy removal, as clearly illustrated in Fig. 11.

It will be noted that the shoulders 42 form a sharp line of demarcation peripherally of the tube so that when the outer rubber covering 22 is applied to the inner tube, the free portion of the outer tube is clearly defined as it is quite important that the tubes be connected to each other throughout their base portions, but not above the portions which lie above the rim flanges when the tube is applied to a rim and tire. If the junction point is above the rim flanges there is a tendency for the tubes to break away from each other, due to the constant flexing of the side walls above the flange area.

Obviously various changes can be made in the particular arrangement and construction of the parts, as well as the method employed without departing from the spirit of this invention, and therefore I do not wish to be limited except as may hereinafter appear in the claims hereunto appended.

Having thus fully described my invention, what I claim and desire to secure by Letters Patent of the United States is:

1. The method of building inner tubes of the plural-chambered type comprising the steps of forming a wall of one chamber, forming a valve with a lateral port and a body of rubber thereon to one side only of said port, applying said valve to said wall with said body of rubber against the wall and with a passage forming core member therebetween and extending into said port, subjecting said wall and body of rubber to a vulcanizing operation to unite the same, and removing said core member, thus forming a passage in communication with said port and extending along the wall of said chamber.

2. The method of building inner tubes of the plural-chambered type comprising the steps of forming a wall of one chamber, forming a valve with a lateral port and a body of rubber thereon to one side only of said port, applying said valve to said wall with said body of rubber against the wall and with a passage forming core member therebetween and extending into said port, subjecting said wall and body of rubber to a vulcanizing operation to unite the same, removing said core member, thus forming a passage in communication with said port and extending along the wall of said chamber, and forming a second chamber adjacent the wall of said first chamber in communication with said passage.

3. The method of building inner tubes of the plural-chambered type comprising the steps of forming a wall of one chamber, forming a valve with a lateral port and a body of rubber thereon on one side only of said port, applying said valve to said wall with said body of rubber against the wall and with a passage forming flexible core member therebetween and extending into said port, subjecting said wall and body of rubber to a vulcanizing operation to unite the same, and removing said core member, thus forming a passage in communication with said port and extending along the wall of said chamber.

4. The method of building inner tubes of the plural-chambered type comprising the steps of forming a wall of one chamber, forming a valve with a lateral port and a body of rubber thereon on one side only of said port, applying said valve to said wall with said body of rubber against the wall and with a passage forming flexible and stretchable core member therebetween and extending into said port, subjecting said wall and body of rubber to a vulcanizing operation to unite the same, and removing said core member, thus forming a passage in communication with said port and extending along the wall of said chamber.

5. The method of building inner tubes of the plural-chambered type comprising the steps of forming a wall of one chamber, forming a valve with a lateral port and a body of rubber thereon on one side only of said port, applying said valve to said wall with said body of rubber against the wall and with a passage forming core member of stretchable vulcanized rubber therebetween and extending into said port, subjecting said wall and body of rubber to a vulcanizing operation to unite the same, and removing said core member, thus forming a passage in communication with said port and extending along the wall of said chamber.

6. The method of building inner tubes of the plural-chambered type comprising the steps of forming a wall of one chamber, forming a valve with a lateral port and a body of rubber thereon on one side only of said port, cementing a passage forming core member to said rubber body with a non-vulcanizable cement and with one end thereof extending into said port, applying said valve to said wall with said body of rubber against the wall and with said core member therebetween, subjecting said wall and body of rubber to a vulcanizing operation to unite the same, and removing said core member, thus forming a passage in communication with said port and extending along the wall of said chamber.

7. The method of building inner tubes of the plural-chambered type comprising the steps of forming a wall of one chamber, forming a valve with a lateral port and a body of rubber thereon on one side only of said port, and with a groove in extension of said port, cementing a passage forming core member in said groove with one end of same in said port, applying said valve to said wall with said body of rubber against the wall and with said core member therebetween, subjecting said wall and body of rubber to a vulcanizing operation to unite the same, and removing said core member, thus forming a passage in communication with said port and extending along the wall of said chamber.

8. The method of forming plural-chambered tubes comprising the steps of forming at least the base wall of one chamber, shaping a valve stem with a longitudinal opening and also a lateral opening, forming a quantity of rubber on the outside of said valve stem, providing a valve opening in said wall of said chamber for the reception of said valve stem, inserting a flexible body in said lateral opening so that it will lie beneath said body of rubber on said valve and said tube, inserting said valve stem into said opening, at least partially vulcanizing the assembled parts to shape the inner chamber, vulcanizing the valve and carcass into a unitary whole, withdrawing the flexible body from said opening, whereby to leave an opening in the outer part of the tube communicating at its inner end with said lateral opening in said valve stem and at its outer end with the outer side of said tube, and molding a flexible outer tube over the inner tube with its base attached to said inner carcass only and in communication with said passage.

9. The method of forming plural-chambered tubes comprising the steps of forming at least the base wall of one chamber, shaping a valve stem with a longitudinal opening and also a lateral opening, forming a quantity of rubber on the outside of said valve stem, providing a valve opening in said wall of said chamber for the reception of said valve stem, inserting a flexible body in said lateral opening so that it will lie beneath said body of rubber on said valve and said tube, inserting said valve stem into said opening, at least partially vulcanizing the assembled parts to shape the inner chamber, vulcanizing the valve and carcass into a unitary whole, withdrawing the flexible body from said opening, whereby to leave an opening in the outer part of the tube communicating at its inner end with said lateral opening in said valve stem and at its outer end with the outer side of said tube, and molding a flexible outer tube over the inner tube with its base attached to said inner carcass only and in communication with said passage, said flexible member comprising a stretchable vulcanized rubber rod.

10. The method of forming plural-chambered tubes comprising the steps of forming at least the base wall of one chamber, shaping a valve stem with a longitudinal opening and also a lateral opening, forming a quantity of rubber on the outside of said valve stem with an extension extending laterally away from the valve body, providing a valve opening in said wall of said chamber for the reception of said valve stem, inserting a flexible, substantially incompressible body in said lateral opening so that it will lie beneath said body of rubber on said valve and said tube, inserting said valve stem into said valve opening, at least partially vulcanizing the assembled parts to shape the inner chamber, vulcanizing the valve and carcass into a unitary whole, withdrawing the flexible incompressible body from said opening, whereby to leave an opening in the outer part of the tube communicating at its inner end with said lateral opening in said valve stem and at its outer end with the outer side of said tube remote from said valve stem, and molding a flexible outer tube over the inner tube with its base attached to said inner carcass only and in communication with said passage.

11. The method of forming plural-chambered tubes comprising the steps of forming at least the base wall of one chamber, shaping a valve stem with a longitudinal opening and also a lateral opening, forming a quantity of rubber on the outside of said valve stem with an extension extending laterally away from the valve body, said extension having a groove on the inner surface in alignment with said lateral opening, providing a valve opening in said wall of said chamber for the reception of said valve stem, inserting a flexible, substantially incompressible body in said lateral opening so that it will lie beneath said body of rubber on said valve and said tube and in said groove, inserting said valve stem into said valve opening, at least partially vulcanizing the assembled parts to shape the inner chamber, vulcanizing the valve and carcass into a unitary whole, withdrawing the flexible incompressible body from said opening and groove, whereby to leave an opening in the outer part of the tube communicating at its inner end with said lateral opening in said valve stem and at its outer end with the outer side of said tube remote from said valve stem, and molding a flexible outer tube over the inner tube with its base attached to said inner carcass only and in communication with said passage.

12. The method of forming plural-chambered tubes comprising the steps of forming at least the base wall of one chamber, shaping a valve stem with a longitudinal opening and also a lateral opening, forming a quantity of rubber on the outside of said valve stem with an extension extending laterally away from the valve body, providing a valve opening in said wall of said chamber for the reception of said valve stem, inserting in said opening a vulcanizable rubber cot having an axial sleeve and an outer, laterally extending flange, inserting a flexible, substantially incompressible body in said lateral opening so that it will lie beneath said body of rubber on said valve and said tube, inserting said valve stem into said cot, at least partially vulcanizing the assembled parts to shape the inner chamber, vulcanizing the valve and carcass into a unitary whole, withdrawing the flexible incompressible body from said opening, whereby to leave an opening in the outer part of the tube communicating at its inner end with said lateral opening in said valve stem and at its outer end with the outer side of said tube remote from said valve stem, and molding a flexible outer tube over the inner tube with its base attached to said inner carcass only and in communication with said passage.

13. The method of forming plural-chambered tubes comprising the steps of forming at least the base wall of one chamber, shaping a valve stem with a longitudinal opening and also a lateral opening, forming a quantity of rubber on the outside of said valve stem with an extension extending laterally away from the valve body, said extension having a groove on the inner surface in alignment with said lateral opening, providing a valve opening in said wall of said chamber for the reception of said valve stem, inserting in said opening a vulcanizable rubber cot having an axial sleeve and an outer, laterally extending flange, inserting a flexible, substantially incompressible body in said lateral opening so that it will lie beneath said body of rubber on said valve and said tube and in said groove, inserting said valve stem into said cot, at least partially vulcanizing the assembled parts to shape the inner chamber, vulcanizing the valve and carcass into a unitary whole, withdrawing the flexible incompressible body from said opening and groove, whereby to leave an opening in the outer part of the tube communicating at its inner end with said lateral opening in said valve stem and at its outer end with the outer side of said tube remote from said valve stem, and molding a flexible outer tube over the inner tube with its base attached to said inner carcass only and in communication with said passage.

14. The method of forming plural-chambered tubes comprising the steps of forming at least the base wall of one chamber, shaping a valve stem with a longitudinal opening and also a lateral opening, forming a quantity of rubber on the outside of said valve stem with an extension extending laterally away from the valve body, said extension having a groove on the inner surface in alignment with said lateral opening, providing a valve opening in said wall of said chamber for the reception of said valve stem, inserting in said opening a vulcanizable rubber cot having an axial sleeve and an outer, laterally extending flange, cementing a flexible, substantially incompressible body in said lateral opening so that it will lie beneath said body of rubber on said valve and said tube and in said groove, inserting said valve stem into said cot, at least partially vulcanizing the assembled parts to shape the inner chamber, vulcanizing the valve and carcass into a unitary whole, withdrawing the flexible, incompressible body from said opening and groove, whereby to leave an opening in the outer part of the tube communicating at its inner end with said lateral opening in said valve stem and at its outer end with the outer side of said tube remote from said valve stem, and molding a flexible outer tube over the inner tube with its base attached to said inner carcass only and in communication with said passage.

15. The method of forming plural-chambered tubes comprising the steps of forming at least the base wall of one chamber, shaping a valve stem with a longitudinal opening and also a lateral opening, forming a quantity of rubber on the outside of said valve stem with an extension extending laterally away from the valve body, said extension having a groove on the inner surface in alignment with said lateral opening, providing a valve opening in said wall of said chamber for the reception of said valve stem, inserting in said opening a vulcanizable rubber cot having an axial sleeve and an outer, laterally extending flange, cementing a flexible, substantially incompressible body in said lateral opening so that it will lie beneath said body of rubber on said valve and said tube and in said groove, inserting said valve stem into said cot, providing said stem with a temporary insert to cut off flow to said lateral opening while permitting flow through said longitudinal opening to permit inflation of said first chamber in a mold, at least partially vulcanizing the assembled parts to shape the inner chamber, vulcanizing the valve and carcass into a unitary whole, withdrawing the flexible incompressible body from said opening and groove, whereby to leave an opening in the outer part of the tube communicating at its inner end with said lateral opening in said valve stem and at its outer end with the outer side of said tube remote from said valve stem, and molding a flexible outer tube over the inner tube with its base attached to said inner carcass only and in communication with said passage.

16. The method of forming a plural-chambered inflatable tube comprising the steps of forming a wall of one chamber, forming a valve body with an inner bore and an opening extending from said bore to the outer side of said valve body, inserting a passage forming core member into said opening and applying said valve body to said wall with said core member extending along said wall, molding a passage communicating with said opening and running along said wall by vulcanizing to said wall a quantity of rubber extending from said body in overlying relation with said wall and core member, and thereafter removing said core member.

CLEMENT J. BURKLEY.